March 18, 1952  A. M. DE JONG  2,589,928
SUSPENSION DEVICE IN SLIDING DOORS AND THE LIKE
Filed July 26, 1949
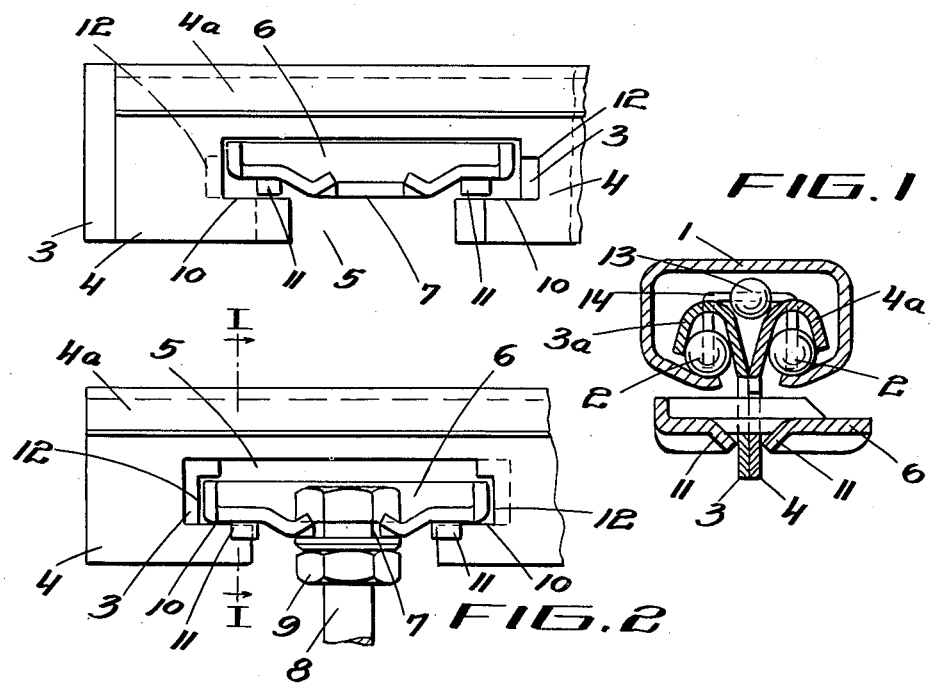
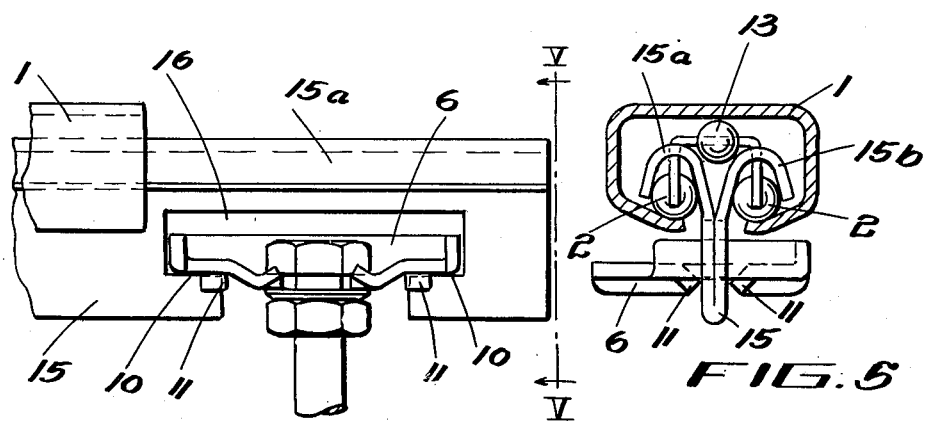
Inventor:
Adriaan Matheus De Jong
By E. F. Wenderoth
Atty Patented Mar. 18, 1952

2,589,928

UNITED STATES PATENT OFFICE 2,589,928

SUSPENSION DEVICE IN SLIDING DOORS AND THE LIKE

Adriaan Matheus de Jong, Stocksund, Sweden

Application July 26, 1949, Serial No. 106,866
In Sweden July 27, 1948

5 Claims. (Cl. 16—88)

The present invention relates to a suspension device for sliding doors and the like having a carriage rolling by means of balls on a guide rail, said carriage having one or more suspension means for the door or the like, and wherein the carriage is formed either by two sheet metal strips having a substantially J-shaped cross-section and lying close to one another with their bent portions, forming guide channels for the balls carrying the carriage, remote from one another, or one single sheet metal strip which is double-bent at the middle of its width and has its longitudinal marginal portions arched in a direction from one another to form guide channels for the balls carrying the carriage, and wherein the sheet metal strip or strips is provided with one or more recesses in the longitudinal edge, opposite to the ball channels, of the thus formed carriage for mounting of the suspension means. This arrangement gives a suspension device of a very simple and inexpensive construction, which is easy to mount and which requires little space in a vertical direction above the sliding door or the like.

The invention will be more closely described in the following with reference to the enclosed drawings showing two embodiments of the invention.

Fig. 1 shows a suspension device according to the invention as seen in cross-section on the line I—I in Fig. 2.

Fig. 2 shows a side view of a portion of the suspension device, a guide rail pertaining to the suspension device being left out for the sake of clearness.

Fig. 3 is the equivalent of Fig. 2 and shows a stage in the mounting of a washer forming part of the suspension device.

Fig. 4 shows another embodiment of the invention in a stage of the mounting, and Fig. 5 shows the device according to Fig. 4 as seen on the line V—V in Fig. 4.

The embodiment shown in Figs. 1 to 3 has a guide rail 1 of a substantially U-shaped cross-section, the leg ends of said rail being bent towards one another to form rests for balls 2 on which a carriage rolls carrying the sliding door or the like. The carriage is formed by two sheet metal strips 3 and 4, which are of a substantially J-shaped cross-section and which lie close to one another with the bent portions 3a and 4a, forming guide channels for the balls carrying the carriage, remote from one another.

The sheet metal strips 3 and 4 have one or more (only one is shown in the drawing) T-shaped recesses 5 in the longitudinal edge opposed to the bent portions 3a and 4a for mounting one or more suspension means for the sliding door or the like. The suspension means, one of which is shown in the drawing, are shaped like a washer 6 with a turned-up margin and an aperture or preferably a slot 7, open towards one side of the washer having no turned-up margin, for engagement with a securing means on the door or the like in the form of a screw 8 having a head and a locking nut 9. The washer 6 is adapted to rest tiltably on the shoulders 10 of the associated T-shaped recess 5 and has lugs 11 disposed in pairs for engagement with the shoulders for retaining the washer thereon.

The corresponding T-shaped recesses 5 of the two sheet metal strips 3 and 4 have a transverse portion which is sufficiently broad for permitting the associated washer 6 to be inserted from the side, as shown by Fig. 3. One of the corresponding T-shaped recesses 5 in the two sheet metal strips 3 and 4 has a notch 12 at one end of its transverse portion and the other a corresponding notch 12 at the opposite end of its transverse portion. The washer 6 being adapted to be engaged in said notches, which resting on the shoulders 10 of the recesses, on a relative displacement of the sheet metal strips in their longitudinal direction in order to lock the washer tiltably but irremovably in the recesses 5 in cooperation with the lugs 11 of the washer, as shown by Fig. 2. In other words the height of the notches 12 must be at least as great as the height of the edge of the washer 6 above the shoulders 10 but smaller than the total height of the washer 6 measured from the lower edge of the lugs 11 to the upper edge of the turned-up margin of the washer.

After the washer 6 has been mounted in recesses 5 of the sheet metal strips 3 and 4 and the latter have been displaced to the position according to Fig. 2 for locking the washer 6 in operative position the sheet metal strips 3 and 4 may be secured to one another, e. g., by point welding or by means of screws or the like.

Between the bent portions 3a and 4a of the sheet metal strips there is formed an upwardly open channel for giving room for counter-balls 13 (only one is shown in Fig. 1), which engage the upper wall of the guide rail 1, if the carriage is lifted upwards from the balls 2. The counter-balls 13 are preferably provided with a diametrical aperture and are each mounted on a yoke 14, the ends of which pass through apertures in the bent sheet metal portions 3a and 4a and project into the running-path of the balls 2 for limiting their movement along the portions 3a and 4a.

The embodiment shown by Figs. 4 and 5 also has a guide rail 1 for a carriage 15 rolling thereon by means of balls 2. The carriage 15 has essentially the same cross sectional form as the one shown by Figs. 1 to 3, which is formed by two sheet metal strips 3 and 4, but the carriage 15 is formed by one single sheet metal strip, which is double-bent at the middle of its width and has its longitudinal marginal portions 15a and 15b arched in opposite directions from one another in order to form the guide channels for the balls 2 and the upwardly open channel for the counter-balls 13.

Like the sheet metal strips 3 and 4 in the embodiment according to Figs. 1-3 the carriage 15 has one or more T-shaped recesses 16 in the longitudinal margin opposite to the bent portions 15a and 15b for receiving one or more suspension washers 6 for the sliding door or the like. The washer 6 arranged for co-operation with the recess 16 is of the same construction as in the embodiment according to Figs. 1 to 3 and has lugs 11 for engagement with the shoulders 10 of the recess 16. The transverse portion of the recess 16 is sufficiently broad to permit the washer 6 to be introduced from the side in position with the washer lugs 11 surrounding the shoulders 10. The transverse portion of the recess 16 is, in the embodiment according to Figs. 4 and 5, disposed at such a height on the carriage 15 that when the carriage is suspended on the guide rail 1 this will reach down near the washer 6 inserted into the recess and will prevent, together with the washer lugs 11, the washer from being removed from the recess 16 but will permit a certain tilting of the washer. In other words, the washer 6 must be inserted into the recess 16 before the carriage 15 is inserted into the guide rail 1, as shown by Fig. 4.

This manner of locking the washer 6 in the T-shaped recess may of course also be used when the carriage is made of two sheet metal strips 3 and 4.

What I claim and desire to secure by Letters Patent is:

1. A suspension device adapted for supporting sliding doors and the like, comprising, a carriage, web means on said carriage, said web means having at least one T-shaped recess therein, the arms of said T-shaped recess being substantially horizontal and the stem of said recess being substantially vertical and opening downwards through an edge of said web means, a washer inserted in the arms of said T-shaped recess and resting on the lower edges of said web defining said arms, securing means adapted to be secured to a door, and interengaging means on said securing means and said washer adapted for suspension of a door on said washer.

2. A suspension device for sliding doors, comprising a carriage, web means on said carriage, said web means having at least one T-shaped recess therein, the arms of said T-shaped recess being substantially horizontal and the stem of said recess being substantially vertical and opening downwards through an edge of said web means, a washer inserted in the arms of said T-shaped recess and resting on the lower edges of said web defining said arms, lugs on said washer depending therefrom on both sides of the lower edges of said web defining the arms of the T-shaped recess for retaining said washer tiltable on said lower edges, securing means adapted to be secured to a door, and interengaging means on said securing means and said washer adapted for suspension of a door on said washer.

3. A suspension device for sliding doors, comprising a carriage, web means on said carriage, said web means having at least one T-shaped recess therein, the arms of said T-shaped recess being substantially horizontal and the stem of said recess being substantially vertical and opening downwards through an edge of said web means, a washer inserted in the arms of said T-shaped recess and resting on the lower edges of said web defining said arms, an upwards projecting suspension stud adapted to be secured to a door, a head on said stud, said washer having a slot therein open at one end, said stud being inserted in said slot and said head resting on the upper surface of said washer.

4. A suspension device as claimed in claim 2, wherein said web means comprises two strips in parallel abutting relationship and longitudinally slidable with respect to one another, each of said strips having a corresponding T-shaped recess therein, the co-operating T-shaped recesses of said strips have a transverse portion sufficiently broad for permitting said washer to be inserted from the side into position therein, each of said two strips which comprise the web having a notch therein, the notch in one said strip opening into one arm of the T-shaped recess from the distal end thereof and with the lower part of the notch being coincident with the lower part of said one arm, and the notch in the other strip opening into the other arm of the T-shaped recess from the distal end thereof and the lower part of the notch being coincident with the lower part of said other arm, said notches having a height only slightly greater than the height of said washer, but less than the combined height of said washer and said lugs, said washer resting on the shoulders of the recesses and being engaged in said notches on a relative displacement of said strips in their longitudinal direction in order to lock the washer tiltably but irremovably in the recesses in co-operation with said lugs of said washer due to the dimension of the notches relative to said washer and lugs.

5. A suspension device for sliding doors, comprising track means, a carriage, rotatable antifriction means supporting said carriage for rolling action on said track, web means on said carriage for rolling action on said track, web means on said carriage depending from said track, said web means having at least one T-shaped recess therein, the arms of said T-shaped recess being substantially horizontal and parallel with said track and the stem of said recess being substantially vertical and opening downwards through an edge of said web means, said recess having a transverse portion sufficiently broad for permitting a washer to be inserted from the side into position therein, a washer inserted in the arms of said T-shaped recess and resting on the lower edges of said web defining said arms, lugs on said washer depending therefrom on both sides of the lower edges of said web defining the arms of the T-shaped recess, the said lower edges defining said arms engaging said washer lugs, said transverse portion of said recess being disposed at such a height on said strip, that, when said carriage is suspended on said track said track extends down near said washer inserted in said recess and prevents, together with said washer lugs, the removal of said washer from the recess but permits limited tilting thereof, securing means adapted to be secured to a door, and interengaging means on said securing means and said washer adapted for suspension of a door on said washer.

ADRIAAN MATHEUS DE JONG.

REFERENCES CITED

The following references are of record in the file of this patent:

UNITED STATES PATENTS

| Number | Name | Date |
| --- | --- | --- |
| 1,503,545 | Meagher | Aug. 5, 1924 |